Feb. 22, 1966  W. J. PORTER, JR., ET AL  3,236,607
APPARATUS FOR IRON ORE REDUCTION
Filed June 11, 1963  3 Sheets-Sheet 1

JOHN FREDERICK MOSER, JR.
WALTER JAMES PORTER, JR. INVENTORS

BY Perry Carvellas

PATENT ATTORNEY

Feb. 22, 1966  W. J. PORTER, JR., ET AL  3,236,607
APPARATUS FOR IRON ORE REDUCTION

Filed June 11, 1963  3 Sheets-Sheet 2

JOHN FREDERICK MOSER, JR.
WALTER JAMES PORTER, JR.  INVENTORS

BY Perry Carvellas

PATENT ATTORNEY

United States Patent Office 3,236,607
Patented Feb. 22, 1966

3,236,607
APPARATUS FOR IRON ORE REDUCTION
Walter James Porter, Jr., Baton Rouge, and John Frederick Moser, Jr., East Baton Rouge Parish, La., assignors to Esso Research and Engineering Company, a corporation of Delaware
Filed June 11, 1963, Ser. No. 287,087
14 Claims. (Cl. 23—284)

This invention relates to a process and apparatus for staging fluid solids reaction zones. More particularly, this invention relates to an apparatus which can be used in a fluid bed process where solids can be reacted with gases or gases with solids and the degree of completion of the respective reactions of the solids and/or gases can be controlled by bringing either additional gas or solids, at any stage of the reaction, into contact with the other to obtain the desired degree of completion of the reaction. More specifically, this invention relates to a method of staging a fluid bed reactor which comprises separating a reactor into two or more stages or chambers by placing one or more vertical transverse baffles in the reactor and providing means for the transfer of solids from one side of the baffles to the other side with minimum backmixing of the transferred solids. Either the same or different gases may flow through the different chambers of the reactor.

More specifically, this invention relates to a process for reducing iron ore to metallic iron in multiple stages utilizing a novel staging and novel process of reduction whereby maximum efficient use of reducing gas and maximum flexibility in the reduction reaction are obtained.

Many problems have complicated the efficient use of the fluid solids bed reaction technique. A characteristic of the fluid solids bed is that the gas composition and the solids composition throughout the bed are substantially uniform. This characteristic, which provides good gas-solids contact and heat transfer, is also the greatest drawback where a high degree of completion of reaction is desired. To overcome this problem, staging of the reduction reaction has been proposed. In staging, the fluid solids are transferred from one reaction zone to another reaction zone, and in each subsequent reaction zone the reaction is more complete. Staging, however, has serious limitations in that each stage has required a separate vessel and a separate means of introducing fluidizing gas. One means of fluidizing a bed of solids is to pass a fluidizing gas through a perforated plate or grid which allows the fluidizing gas to pass through upward but does not allow the solids to pass through downward. If the fluidizing gas contains any entrained solids, the grids tend to plug and defluidize the bed. Where several fluid beds were used, problems were encountered in transferring the solids from one bed to another.

A conventional means of transferring solids is through connecting downcomers or risers. However, the more of the units that are used, the more chance there is that one of the connecting means will plug. At each stage of the reaction, with particular solids and gaseous reactants, equilibrium of the reaction is reached at a particular temperature and pressure. It is frequently necessary to vary the composition of the reacting gases in contact with a fluid bed of solids at different stages in the reaction to carry the reaction to the desired degree of completion. This requires a multiplicity of units, several downcomers or risers to transfer the solids, and equipment for cycling the gases. This results in a large, bulky, and unwieldly apparatus with a minimum amount of flexibility of gas and solids staging.

One area in which the fluid solids technique has become useful is in reducing metal oxides to metal, and particularly in reducing iron oxides to metallic iron. The reduction efficiency of iron oxide to metallic iron can be increased by solids and gas staging and by treating the most highly reduced ore with a gas having the greatest reducing capacity.

In addition to the staging problems, fluidizing grid problems, and transfer of solids from one stage to another, in direct iron ore reduction there is a major problem of providing sufficient heat to the various stages of reduction for carrying out the reduction reaction. Reducing gases, such as hydrogen and hydrogen containing up to 60% carbon monoxide, are most commonly used to reduce iron oxides to metallic iron. The iron oxide can be preheated by direct contact with the hot gas. The preheated ore can be introduced into the first stage of reduction and sufficient heat will be available as sensible heat of the ore to carry out the first stage of reduction. Also, heat to the final stage of reduction can be obtained by preheating the reducing gas fed to this stage to high temperatures and thus providing heat to the final stage of reduction as the sensible heat of the preheated reducing gas. If substantial amounts of carbon monoxide are present in the reducing gas, the maximum temperature to which it can be heated is limited; whereas, if hydrogen alone is used as the reducing gas, the maximum temperature to which it can be heated prior to introduction to the reducing zone is limited only by the temperature at which the highly reduced ore sinters and agglomerates. The apparatus and fluid solids handling technique of the present invention can be used with either carbon monoxide and hydrogen or hydrogen alone as the reducing gas.

The present invention is directed particularly to an apparatus for gas and/or solids staging of a reactor and to a process of using the staged reactor. In accordance with the present invention, reactor staging is provided by using a vertically disposed, elongated vessel having a transverse baffle extending across the vessel, which connects the two sides of the vessel, dividing said vessel into two chambers, said chambers being made up of said baffle and the walls of said vessel, the ends of said baffle extending in either direction to approximately the same length as said vessel, said vessel having end portions closing the ends of the vessel, the top of said baffle not extending to said end portions and thereby allowing gases and solids communication at the top of said vessel between the chambers of said vessel. Communication of solids and gases at the top of said vessel in going from one chamber of the vessel to the other is by passage over the edge of said transverse baffle. The bottom of said transverse baffle does not extend completely to the bottom portion closing the bottom of the vessel and allows gaseous communication at the bottom of the vessel between said chambers. Solids communication at the bottom of the vessel is prevented by a suitable perforated plate which is parallel to the bottom plate of said vessel and connected to and normal to the bottom edge of said transverse baffle.

The apparatus of the present invention in accordance with the above description contains an elongated, vertical vessel, cylindrical in shape, containing within the vessel a transverse baffle dividing the vessel into two chambers which have gaseous communication at the top and bottom and solids communication only at the top. At the bottom of the transverse baffle there is a perforated plate parallel to the bottom plate and connected to the transverse baffle which forms at the bottom of the vessel a circular chamber containing a bottom plate and above the bottom plate a perforated plate parallel to the bottom plate. The two parallel plates and the walls of the vessel form an unobstructed chamber.

The apparatus is further described as having a means for feeding solids into the top of one chamber of said vessel at a point contiguous to but below the upper edge of said vertical transverse baffle, said means communicating between the outside and the inside of said chamber. There is also means of removing solids from the other of the said chambers by a tubular extension which extends from a point contiguous to but significantly below the upper edge of said uppermost extension of said transverse baffle through and out of said chamber, whereby solids may flow into said tubular extension and be removed from said chamber. The apparatus is further provided with a means for introducing a gas into the bottom of said vessel, which gas flows upward through both of said chambers, and a means for removing the gas from the top of said vessel.

The apparatus and process of the present invention can be used to react solids with gases or gases with solids either of which can be the primary product of the reaction. The solids may react; e.g., in reducing metal oxides to metal by contact with a suitable reducing gas which is, in turn, oxidized. The solids can be the catalyst in a reaction where gases are treated and changed by contact with the solids. Also, the apparatus can be used to regenerate spent catalyst by burning or oxidizing the catalyst in a fluid bed.

The fluid bed technique is widely employed, for example, in catalytic cracking and in the production of hydrocarbons by the catalytic reaction of hydrogen and carbon monoxide. In a fluid bed the gas velocity, gas density, the particle size and density of the solids are interrelated and controlled so as to maintain the solids in a dense turbulent state simulating a boiling liquid. The solids undergo extensive vertical and horizontal motion and assume a pseudo liquid level with the result that there is minimum removal of fine solids from the reaction zone in the effluent gas. Maintenance of iron ore in the form of a fluid bed during reduction of iron ore, for example, with hydrogen as the reducing gas is assured by passage of hydrogen through a bed of iron particles at a superficial linear velocity sufficient to fluidize the finely divided solids. The technique for obtaining a fluid bed is well known and will not be described in any greater detail.

The apparatus and process of the present invention may be carried out at subatmospheric, atmospheric, and superatmospheric temperature and pressure. The vessel is constructed of materials to withstand the desired pressures and temperatures of operation. The reactor can be operated at temperatures in the range of 100° F. up to 3000° F., and more generally at temperatures of 800° F. to 2200° F., and preferably at temperatures of about 800° F. to 1800° F. Pressures in the vessel may vary from atmospheric up to about 1000 p.s.i.g. and more generally between 50 p.s.i.g. up to 800 p.s.i.g., and preferably from 50 p.s.i.g. to 600 p.s.i.g. The size of the solids treated in the apparatus are those which can be fluidized at about 10 microns to ¾ inch, and preferably about 10 microns to ¼ inch. The superficial linear velocities of fluidizing gases used in accordance with the process will depend upon the density of the gases and the size and density of the solids but will generally be in the range of 0.01 to 10 ft./sec., more generally 0.2 to 6 ft./sec., and preferably about 0.5 to 4 ft./sec. Fluid beds can vary in depth of 0.5 to 100 ft., more generally about 2 to 60 ft., and preferably about 3 to 40 ft. The diameter of the entire fluid bed, not including the transverse baffles, which is contacted by the fluidizing gas can be 2 inches to 40 ft., more generally 5 inches to 30 ft. and preferably about 1 to 25 ft. The position at which the transverse baffle is inserted in a vessel will determine the percentage of solids on either side. This also can be used to control the holdup time of the solids in one of the chambers of the vessel.

Many advantages accrue from the present invention. By dividing a single vessel into two or more chambers and allowing the staging and transfer of solids by overflow of the transverse baffle or passage through a suitable weir seal many of the connecting downcomers and risers used to transmit solids in conventional equipment can be eliminated and problems of plugging in these means of transmission overcome. Also, instead of using a perforated plate as a fluidizing grid, a conical gas distributor can be used, or where a grid is used one grid can be used for two or more stages, thus minimizing the problem of grid plugging.

This invention provides a means for gas and/or solids staging and at the same time minimizes to a large extent many of the problems arising from staging. Smaller, compact, highly staged reaction vessels can be provided by using the present invention. The holdup time within a particular stage, i.e., chamber of a vessel, can be varied by varying the position at which the transverse baffle is inserted. Backmixing is minimized by using the transverse baffle and allowing overflow of the solids from one stage to another and carefully controlling the fluidizing gas so that there is a minimum amount of solids entrainment in the off-gases. By dividing the reaction vessel into two or more chambers, one, two or more different fluidizing and reducing gases can be introduced into each of the one, two or more stages. This provides a great deal more flexibility in treating solids than heretofore has been practical.

A specific application of the apparatus and process of the present invention is in direct iron ore reduction. By using two of the embodiments of the invention, for example, the apparatus of FIGURE 2 and FIGURE 4 in combination, four solid stages and three gas stages can be obtained. In this combination only one downcomer is used to transfer solids between the two different vessels and only one fluidizing grid is needed. Preheat for the ore is provided in the first solids stage and preheat for the reducing gas supplied by a suitable furnace. This embodiment gives sufficient flexibility of providing heat so that the desired reactions can be carried out in the desired zones. Gas staging and flexibility are provided by separate means of introduction of gases to a particular zone and the means of taking off-gases from a particular zone. In this manner, maximum efficient use of reducing gases is obtained in any particular zone desired.

Reference is now made to the drawings in which.

Figure 5:
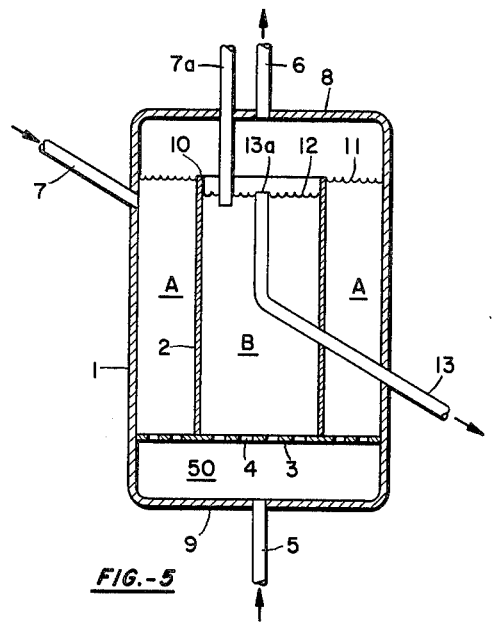

FIGURE 5 of the drawings is an illustration of and embodiment of the invention where instead of having a vertical transverse baffle providing staging, a concentric circular baffle is inserted within the circular elongated vessel and provides the staging. In this figure, a single gas is introduced and a single gas is withdrawn.

Figure 6:
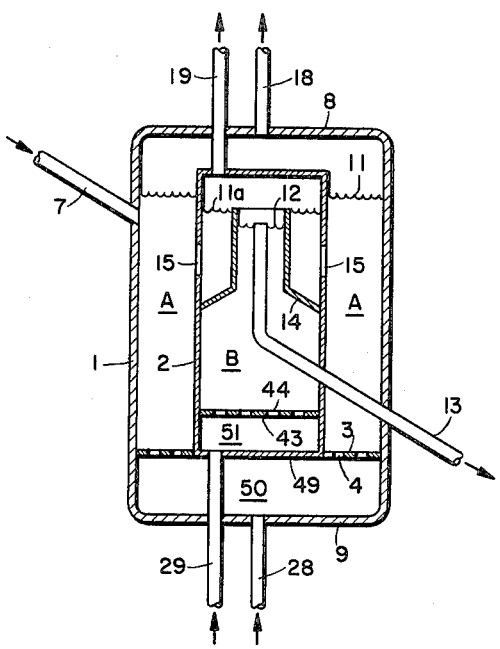

FIGURE 6 is another embodiment of the invention where two separate gases are introduced and two separate gases are withdrawn and a modified means of preventing solids backmixing is provided.

Figure 7:
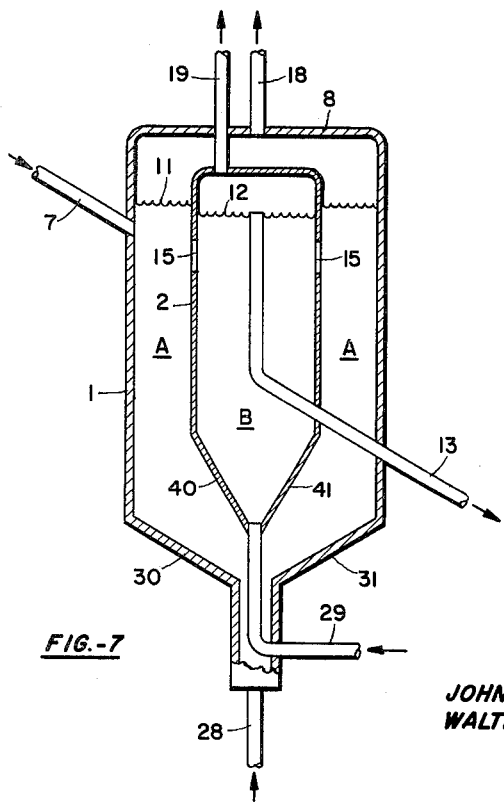

FIGURE 7 illustrates the same embodiment except a conical gas distributor is used in each of the stages to introduce the separate gases.

Figure 8:
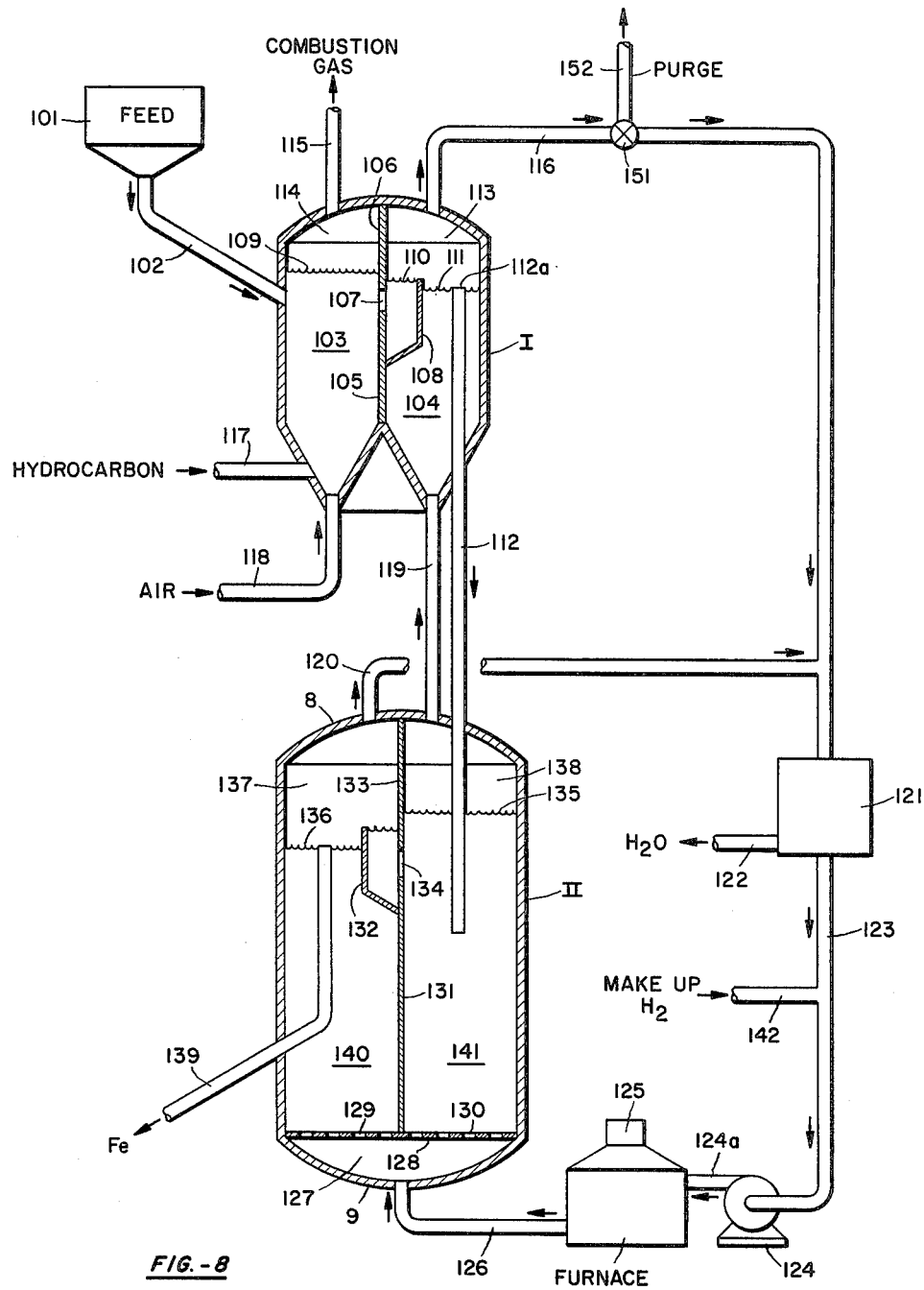

FIGURE 8 of the drawings illustrates an embodiment wherein two of the previously described figures are combined to provide a reaction apparatus for carrying out direct iron ore reduction using hydrogen as the reducing gas.

Figure 1:
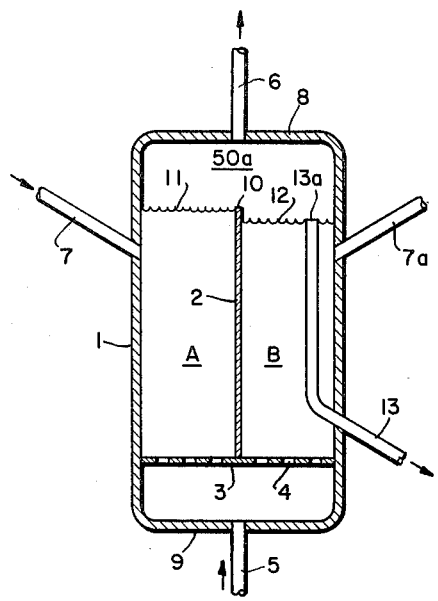
FIGURE 1 is an illustration of the embodiment of the present invention wherein a single circular vessel is divided into two chambers by a transverse baffle which provides for introducing a single gas in the bottom of the vessel and for removal of a single reacting gas from the top of the vessel. The reactor is divided into two solids stages; solids in both stages are contacted with the same gas.

The invention may be better understood with a more detailed description of how the various embodiments of the invention can be carried out. With reference to FIGURE 1 of the drawings, a finely divided fluidizable solid is introduced through lines 7 and 7a simultaneously into chambers A and B of vessel 1. The finely divided solids in chambers A and B are maintained as a fluidized bed of solids by the introduction of the fluidizing and reacting gas through line 5 into chamber 50 and through holes 4 in perforated fluidizing disc 3. As the solids flow into chambers A and B, they build up to levels 11 and 12 at which time introduction of feed through line 7a is stopped. By continuing the introduction of solids through line 7 the solids in chamber A overflow the uppermost edge 10 of transverse baffle 2 into chamber B. The level of the fluidized finely divided particles in chamber B builds up until a level of 12 is reached, and the solids then overflow into the opened end of downcomer 13A and flow out of chamber B through downcomer 13 and can be collected in a suitable manner. The opened end 13A may be protected to prevent bypassing by suitable baffling. Fluidizing gas is introduced at such a rate that there is a minimum amount of solids entrainment in the gas in space 50A and a minimum amount of solids are withdrawn through the top of the vessel through line 6. In the above described manner the level of the solids in each of chamber A and chamber B are easily and automatically maintained. The residence time in the reactor for the solids is controlled by the rate of introduction of the solids through line 7.

Figure 2:
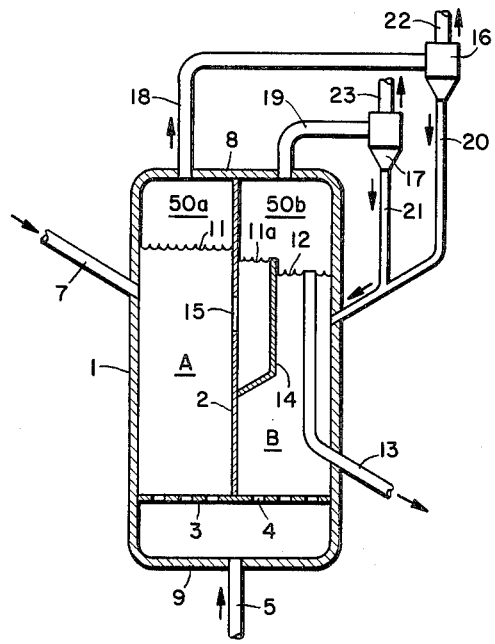
FIGURE 2 illustrates an embodiment of the invention wherein the same reacting gas is introduced into the vessel but two different gases are removed from the top of the vessel. Entrained solids are removed and returned to one of the reaction zones of the vessel and a weir seal is used to prevent solids backmixing.

The apparatus of FIGURE 2 is operated in much the same manner as the apparatus of FIGURE 1 with the following exceptions. Instead of solids staging by overflow of solids over the upper edge 10 of transverse baffle 2, the solids are transferred from chamber A to chamber B by flowing through opening slot 15 in transverse baffle 2 of the aerated weir seal whereby the solids reach a level of 11A and overflow member 14 of the aerated weir seal, i.e., the upper edge of member 14, into chamber B until a level of 12 is reached. There are several alvantages in using this embodiment of the invention even though the same reducing or fluidizing gas is fed into the vessel through line 5 and contacts both the fluidized solids in chambers A and B. The backmixing of the solids as they flow from chambers A to B is practically eliminated by use of the aerated weir seal. Also, another advantage of this apparatus is that backmixing of solids entrained in the gas which randomly fall back into chambers A to B from spaces 50A and 50B is prevented by an extension of the transverse baffle 2 to the top plate 8 of the vessel. Therefore, there is no backmixing of entrained solids by falling from one side of the vessel to the other. A further advantage obtained is that the gases passing through each of chambers A and B are separately removed through lines 18 and 19, respectively. This is a great advantage, particularly where the reaction equilibrium in chamber A is different from that in chamber B. The degree of completion of reaction of the gases fed to A and B and removed by lines 18 and 19 will be different and the gases can be handled separately. Any entrained solids withdrawn with the gases in lines 18 and 19 are separated in cyclone separators 16 and 17, respectively. These separated solids may be returned to the same zone from which they were obtained or may be, in accordance with this embodiment, combined in dipleg 21 and returned to chamber B. The gases free of entrained solids in lines 22 and 23 can then each be handled in a different manner if so desired.

Figure 3:
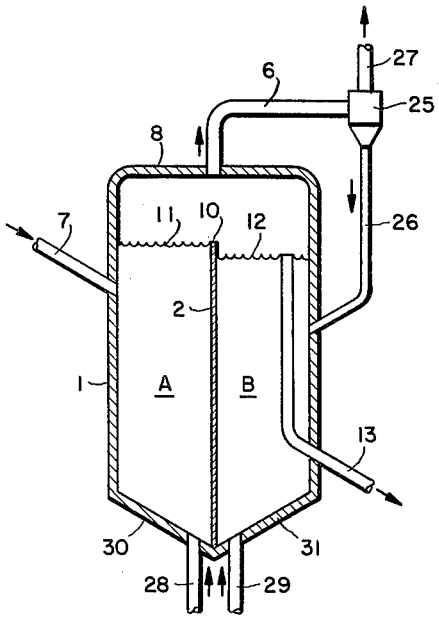
FIGURE 3 illustrates an embodiment wherein a conical gas distributor is used wherein two different gases are introduced to the bottom of the vessel and a single gas is withdrawn from the top of the vessel.

With reference to FIGURE 3 of the drawings, rather than use a fluidizing grid as in FIGURES 1 and 2, a conical gas distributor is used, thus avoiding the use of the grid and obviating the probability of plugging of the grid where the hot fluidizing reacting gases containing finely divided solids may be used. In this embodiment the same or different gas is separately introduced through lines 28 and 29. The vessel has tapered, bottom plates 30 and 31 slanted at a substantial angle from the horizontal and provides for sufficient fluidization of the finely divided solids in the vessel. This is merely a schematic drawing and it is contemplated to use conventional conical gas distributors. The primary modification in this zone is the use of conical gas distributor and separate means for introducing gas to each of the chambers; otherwise, this reaction vessel will operate in much the same manner as in FIGURE 1. The entrained solids from both A and B are withdrawn through a common line 6 and introduced to cyclone separator 25 and in this case returned to chamber B through line 26, though they could alternatively be returned to chamber A. The offgas free of entrained solids is removed through line 27 and can be handled in any manner desired.

Figure 4:
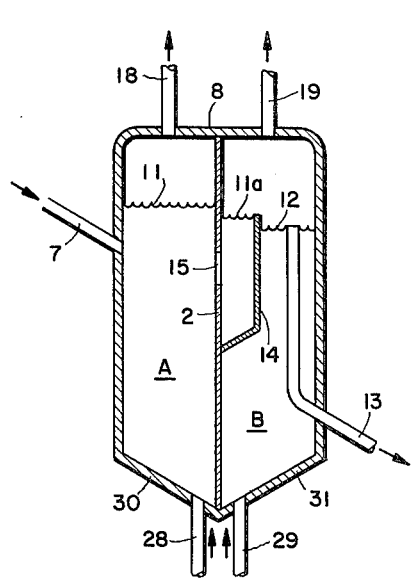
FIGURE 4 illustrates an embodiment using a conical gas distributor where either the same or two different gases may be introduced to the bottom of the vessel and two different gases are withdrawn from the top of the vessel.

In reference to FIGURE 4, this embodiment contains a conical gas distributor as in FIGURE 3, and the aerated weir seal as in FIGURE 2 and otherwise operates as those embodiments to the extent that the description is relevant. An example of gas staging with this embodiment would be to feed fresh gas into chamber B through line 29 and to feed the gas removed by line 19 into chamber A through line 28.

With reference to FIGURE 5 of the drawings, instead of using a flat transverse baffle as in FIGURE 1 for connecting both sides of the cylindrical, elongated vessel to separate the vessel into two different chambers, a smaller concentric elongated vessel may be inserted within the larger cylindrical vessel to provide the desired staging. In this embodiment, finely divided solids are introduced simultaneously through lines 7 and 7a and fill the annular chamber A surrounding the elongated cylindrical vessel 2 and cylindrical chamber B while at the same time introducing fluidizing gas through line 5. After chambers A and B are filled, the feed through line 7a is discontinued. After the solids are accumulated in both chambers A and B, the fluidizing or reacting gas is continuously fed through line 5 and an opening in bottom plate 9 into plenum gas chamber 50 and passes up through perforated plate 3 through holes 4 fluidizing the finely divided solids in chambers A and B. The feed is continually fed through line 7 and the solids level 11 rises and overflows the upper edge 10 of the concentric vessel 2 and the solids flow more or less uniformly over edge 10 into chamber B raising the level of the solids in chamber B to a level 12 when the solids then overflow into the upper edge 13A of downcomer 13 and are removed from the vessel. One advantage of this embodiment of the invention is that heat can be transmitted to chamber B from hot solids introduced into chamber A, thus providing heat by indirect heat exchange to chamber B.

Referring to FIGURE 6, an embodiment of the invention is illustrated wherein the concentric vessels similar to those described in FIGURE 5 are provided. In this embodiment, however, two different fluidizing reacting gases are introduced to the staged reactor. One gas is introduced through line 28, enters plenum chamber 50, and passes through openings 4 in grid 3 into annual chamber A, fluidizing the solids in this annular chamber, passing up through the fluidized solids and out through line 18. A second gas is introduced through line 29 into chamber 51 through grid 43 through holes 44, enters concentric chamber B, fluidizes the solids in chamber B and passes out through line 19. The same or different gases can be introduced through lines 28 or 29. The same gases at different temperatures or different gases at different temperatures can be used, and the reactant gases are removed through separate means thereby providing considerable flexibility in this unit. Also, heat can be supplied to either chambers A or B by providing a very high preheat to the gas introduced through either lines 28 or 29. Otherwise, this apparatus functions in a manner similar to FIGURE 5 and FIGURE 2 of the drawings. This embodiment utilizes an aerated weir seal where the fluidized solids flow through opening 15 of circular member 2 of the concentric vessel into the fluidized area until a level of 11A is reached and then the solids overflow the uppermost edge of member 14 of the aerated weir into chamber B until a solids level 12 is reached. When the solids level 12 is reached, the solids overflow into downcomer 13 and are removed from the vessel.

FIGURE 7 is another embodiment of the invention whereby a conical gas distributor is used both for chamber A and chamber B and the same or two different gases are introduced and two different gases are removed as described in FIGURE 6. The advantage of this embodiment is that no fluidizing grids are used; therefore, the problem of grid plugging is overcome. Where a fresh gas free of entrained solids is used, the apparatus of FIGURES 1, 2, 5, and 6 can be conveniently used; however, where a fluidizing gas containing entrained solids is used, it is preferred to use the apparatus of FIGURES 3, 4 and 7, using conical gas distributors.

To prevent plugging and packing in the aerated seal area, a small amount of fluidizing gas is introduced through the bottom of member 14, by a means not shown, to maintain the solids in the aerated seal in a fluidized state and to maintain an even flow of the solids through openings 15 and over the uppermost edge 14 of the aerated seal into the second chamber of the reaction zone.

The invention is further illustrated by FIGURE 8 of the drawings. In a preferred embodiment of the invention two of the units described above are used in series to provide an efficient fluid contacting apparatus and process for the direct reduction of iron ore. Hydrogen or hydrogen mixed with nitrogen is used as the reducing gas and fluidizing gas. This embodiment of the invention provides a preheat and prereducing zone and three stages of reduction. The hydrogen is recycled to extinction to obtain efficient use of the hydrogen. As previously discussed, flexibility and heating the various reducing zones to carry the reduction to completion have been two of the principal problems involved in direct reduction of iron ore. Heating is particularly a problem where hydrogen is used as the reducing gas since the hydrogen reduction reaction is strongly endothermic. In accordance with this embodiment of the invention, preheat to the first stage of reduction is obtained by burning a hydrocarbon fuel with air or an oxygen-containing gas at a very high temperature in a fluid bed of iron ore feed. The heat to the first stage of the reduction zone is provided as sensible heat of the preheated ore. The second and third stages of the reduction are heated by heating the reducing gas, hydrogen, to a high temperature in a preheat furnace. Sufficient heat to carry out the reduction is thus provided to each of the reduction zones. In this manner, flexibility of providing heat for the reduction is obtained and recycle of hydrogen provides for maximum efficient use of hydrogen. Preheating the ore separately avoids contaminating the reducing gas with extraneous combustion products from the preheating step.

Iron ore is stored in ore storage bin 101 and introduced through line 102 at a rate sufficient to provide 1000 tons/day of 95% reduced metallic iron product. The ore is introduced into preheat prereducing zone 103. A suitable hydrocarbon fuel introduced through line 117 is partially oxidized with an oxygen-containing gas introduced through line 118. The hydrocarbon fuel may consist of natural gas, methane, ethane, propane, butane, normally liquid hydrocarbons, etc. Preferably, air is used to burn the fuel in that it is much less expensive and easier to handle than oxygen. The combustion products from the hydrocarbon fuel in zone 103 provide the fluidizing gases to maintain the finely divided solids in this zone in a fluid state and, since the combustion is strongly exothermic, a great deal of heat is added to the fluidized solids as sensible heat of the solids. The combustion of the hydrocarbon is controlled so that some carbon monoxide is produced to partially reduce some of the $Fe_2O_3$ in this zone to $Fe_3O_4$. The combustion in this zone, in order that there be some reducing capacity for $Fe_2O_3$, is controlled by controlling the ratio of the oxygen in the air to the carbon in the hydrocarbon at about 0.5 to 1.5 and preferably at about 0.5 to 1.0. This ratio is controlled so that enough of the carbon is completely oxidized to $CO_2$ and enough of the hydrogen to $H_2O$ to provide a preheat temperature in this zone of about 1000 to 2000° F., preferably about 1100 to 1800° F., and more preferably about 1200 to 1500° F. However, this ratio is also controlled so that sufficient CO and hydrogen are produced so that the gas is at least partially reducing for the $Fe_2O_3$. The pressure in the entire system is about 0 to 1000 p.s.i.g. and preferably about 50 to 800 p.s.i.g. A pressure differential between the bottom of the first stage of reduction where the reduced product is withdrawn and the top of the reaction zone 104 wherein the effluent gases from the first stage of the reduction are withdrawn can vary between 5 and 200 p.s.i.g., preferably between 25 and 150 p.s.i.g., and specifically about 50 p.s.i.g. The difference in pressure is directly affected by the depth of the fluid beds. As the feed is introduced to bed 103, the level 109 builds up to a point at which it is above opening 107 so as to provide a gas seal between spaces 113 and 114. The fluidized solids flow through opening 107 in the aerated weir seal filling the inner area of this seal to a level of about 110 and overflow aerated seal member 108 until bed 104 reaches a level of about 111. The level 111 is determined by the height of the uppermost portion of downcomer 112, namely 112A. The solids in zone 104 are fluidized by gas introduced through line 119. Since fluidized solid particles behave as liquids, the level of solids in bed 104 attempts to reach the level of solids in bed 103, namely, level 109. However, as the solids build up by flow of solids from bed 103 to bed 104, they overflow opening 112A and flow out of bed 104 through downcomer 112. A continuous flow of solids from bed 103 to bed 104 is maintained and levels 109 and 111 are maintained about constant.

The residence time of the solids in reactor 1 is determined by the rate of flow of feed from storage bin 101. The off gases from the combustion of hydrocarbon and air in zone 103 go into space 114 and are removed through line 115 and are reduced to atmospheric pressure by suitable depressuring valve not shown. These gases can be used for preheat of other streams, etc. Sufficient heat is added in bed 103 to maintain a temperature in bed 104 of about 1100 to 1800° F., preferably about 1200 to 1500° F., at which temperature the iron ore is partially reduced in this zone. Since there is a gas seal between spaces 104 and 103, the combustion products from the combustion of hydrocarbon and air in bed 103 are not present in bed 104. Also, due to the presence of the aerated weir, none of the solids which flow into bed 104 are allowed to flow back into bed 103. Any entrained solids in the gases removed from space 114 can be returned to bed 103 by suitable solids gaseous separating device, not shown.

Substantially pure hydrogen gas is introduced through line 119 into bed 104 fluidizing the finely divided, partially reduced iron oxide in this zone and further reducing the iron oxide in this zone from a mixture of $Fe_2O_3$ and $Fe_3O_4$ to predominantly FeO and some Fe. In reducing the ore, the hydrogen is partially oxidized to $H_2O$ and the effluent gases from this zone collect in chamber 113 and are removed by line 116. Some solid particles may be entrained in this gas and these solid particles can be returned to zone 104 or a zone of higher degree of reduction by suitable gas solids separating means, not shown. Beds 103 and 104 are separated by a vertical transverse baffle 105 which has an opening or slot 107 allowing the flow of solids from bed 103 to bed 104. The transverse baffle 105 continues to the top of reaction vessel I by extension 106, terminating at the top of the vessel, thereby providing efficient gas and solids separation in the zone. Effluent off-gases in line 116 are at the lowest pressure in the system and contain the maximum amount of oxidation product, namely, $H_2O$. Where nitrogen is used with $H_2$, the inert gases can be maintained at a low level by purging a portion of the gas through valve 151 periodically as required, and line 152. Depending on the economics involved, instead of burning hydrocarbon in zone 103, a low reducing capacity hydrogen effluent gas from lines 116 or 120 or from line 119 may be fed to zone 103 and partially oxidized with air or completely oxidized with air to provide the heat required for preheat in zone 103. However, in most instances it is more economical to burn an extraneous fuel, such as natural gas with air, in this zone to provide preheat.

Since hydrogen is a very expensive reducing gas it is desirable, in order to have an economic reducing operation, to recycle this gas to extinction. This is accomplished by recycling the effluent gases in line 116 to the process. However, to prevent buildup of oxidizing gas components, namely water, which would cause back-oxidation of the iron ore in reactor II, it is desirable to cool the effluent gases in zone 121 to condense and remove water through line 122. The dry hydrogen is removed from zone 121 through line 123. Fresh makeup hydrogen from a suitable source is introduced through line 142 as needed.

Comercially available processes for the production of hydrogen yield a gas generally containing better than 90% by volume of hydrogen. Such gas is advantageously utilized as fresh feed or makeup gas. Since means of obtaining hydrogen are well known, it has not been shown in the figure of the drawing.

The dry recycle hydrogen, together with fresh makeup hydrogen, is drawn into compressor 124 which raises the pressure sufficiently to compensate for the pressure losses in the system. The recompressed gases are recycled to the reactor after passing through line 124A, furnace 125, and line 126. Compressor 124 increases the pressure of the gase a sufficient amount to introduce it into reactor II. Furnace 125 increases the temperature of the recycle hydrogen to a temperature of about 200-300° above the temperature required to carry out the reactions in zones 140 and 141. This temperature can be 1300 to 2100° F. or more, preferably 1500 to 1800° F.

The off-gas before recycle is dried by cooling the gases in zone 121 to a temperature of about 70 to 300° F., preferably 100 to 200° F., at which temperature substanially all of the water in the gas is condensed out and removed. The gas in line 126 contains about 30 to 95% hydrogen, more desirably about 50 to 80% hydrogen. The preheated hydrogen is introduced into chamber 127 of reaction zone II and proceeds into reaction zones 140 and 141 by passing through fluidizing grid 128 and holes 129 and 130. The holdup time in either of these reaction zones can be varied by altering the position at which transverse baffle 131 is put in the reactor II. Also, the ratio of fluidizing and reducing gas in chamber 127 which passes into zone 140 and 141 can be deterimned by the relative size of the holes 129 and 130 in fluidizing grid 128. That is, if there are the same number of holes on each side of baffle 131 but the holes in zone 140 are larger, proportionately more gas will go into zone 141.

The reaction temperatures in zones 140 and 141 in the embodiment are maintained at about 1100 to 1800 F. and preferably about 1200 to 1500° F. Partially reduced ore consisting primarily of FeO is introduced through downcomer 112 into zone 141, and simultaneously ore is introduced to zone 140, until the solids reach operating levels in both zones. The ore fills zone 141 to a level of about 135 and the fluidized ore flows through opening 134 through the aerated weir seal into reaction zone 140, and as the solids build up in zone 140 the solids attempt to reach the same solids level as level 135 but instead overflow into downcomer 139 and are removed from the vessel. The reduction of FeO to metallic iron requires the longest residence time and reducing gas of the highest capacity. In this process, two zones are used to reduce FeO to Fe, and a long reduction time is allowed and staging between a mixture of FeO and Fe and between solids which are predominantly Fe is obtained by the use of baffle 131. Since the FeO in zone 141 is on the average at a higher state of oxidation than the solids in zone 140, the off-gases in chamber 138 withdrawn through line 119 have slightly less reducing capacity than the off-gases in chamber 137 withdrawn through line 120. Though the gases in line 119 have slightly less reducing capacity than the gases in line 120, there is more than enough reducing capacity in these gases to carry out the reduction in bed 104. The gases in line 120 are passed to line 116 where they are joined by the gases from zone 116, are regenerated, and recycled.

Another method of circulating the hydrogen reducing gas would be to modify reactor II so that baffle 131 extended downward to bottom plate 9 separating chamber 127 into two parts. The fresh reducing gas would be first fed through holes 129 to zone 140, off-gas removed by line 120 would be fed through hole 130 to zone 141, and off-gas from zone 141 fed to zone 105. The off-gas from zone 105 would be regenerated and recycled to zone 140.

The above described process and apparatus illustrates an efficient method of carrying out iron ore reduction where considerable flexibility in the use of reducing gases and providing perheat can be obtained with a minimum of equipment and relatively compact apparatus.

Conventional auxiliary equipment used in a conventional manner has been omitted from the drawings in order to simplify the drawings and the explanation of the drawings. For example, normally gas solid separators will be inserted in lines 120, 119, 115, and 116 to separate entrained solids from these gases and to return the entrained solids either to the same reaction zone or to a zone below. Also, obvious methods of heat exchange to conserve heat energy have been omitted, for example, the pressurized gases in line 124A may be heat exchanged with the hot effluent gases in lines 119, 120, 116, and/or 115 prior to being introduced to furnace 125.

Obvious variations are considered to be within the scope of the invention. For example, the hydrogen in line 126 may be split and sent separately to zone 140 and zone 141 and preheated to different preheat temperatures so that the reactions in this zone may be carried out at different temperatures or pressures. This equipment can also be used to carry out the reduction with a gas consisting of a mixture of hydrogen and carbon monoxide. The reaction temperatures and pressures would be different and a means for removing $CO_2$ would be added if the off-gas were to be recycled.

Other obvious variations of the process and apparatus are intended to be included. For example, the vessel may be other than cylindrical in shape, e.g., square or rectangular. The vessel may be horizontally disposed rather than vertically disposed. Also, the vessel may have more than one transverse baffle and the transverse baffles may be placed in the vessel normal to each other. With reference to the embodiment which has a concentric vessel providing the staging, there may be more than one such vessel, e.g., 2 or 3 concentric vessels. Various combinations of the described embodiments are also intended to be included.

Also, instead of using an aerated weir seal, a more conventional type of valve or even an opening with a stopper or plug may be used to control the flow of solids between the chambers and to prevent solids backmixing. The embodiments illustrated in the drawings, however, are preferred.

In view of the various modifications of the invention which will occur to those skilled in the art upon consideration of the foregoing disclosure without departing from the spirit and scope thereof, only such limitations should be imposed as are indicated by the appended claims.

What is claimed is:

1. In an apparatus for conducting a gas-fluidized solids reaction which includes a vessel having enclosing side, top, and bottom walls, gas and solids inlet and outlet means, a partitioning vertical baffle located therein which divides the vessel into solids inlet and solids outlet chambers which can function simultaneously as gas-fluidized solids treating chambers, and wherein said baffle contains an opening connecting together said inlet and outlet chambers, and bottom inlet and top outlet means for introduction and removal of fluidizing gases from the chambers, the improvement comprising an overflow member within an outlet chamber affixed to the vertical baffle below the opening, enclosing said opening to a level located above the top of said opening to form, with the opening, an aerated weir seal which provides in operation of the vessel for the one-way flow of fluidized solids through the opening by overflow of solids across the overflow member downwardly into the outlet chamber thus substantially eliminating backmixing of fluidized solids between the chambers during treatment, and during withdrawal of solids from said outlet chamber.

2. In apparatus for conducting a gas-fluidized solids reaction which includes a vessel having enclosing side, top and bottom walls, and within the confines of which is contained a bottom-mounted, vertical baffle extending upwardly and affixed to the top wall to divide the interior of the vessel into two separate chambers, a solids inlet and a solids outlet chamber which can function simultaneously as gas-fluidized solids treating chambers, said baffle containing an opening connection together the two chambers, and bottom inlet and top outlet means for introducing and removal of gases, the improvement comprising an overflow member within the outlet chamber affixed to the vertical baffle below the opening, and extending upwardly around and to a location above the opening to partially enclose same and to form, with the opening, an aerated weir seal which can provide in the use of the vessel for the one-way passage of fluidized solids from the inlet chamber through the opening of the aerated weir seal by overflow of the solids across the overflow member downwardly into the outlet chamber to substantially eliminate backmixing of the fluidized solids of the outlet chamber with the solids of the inlet chamber during treatment of the solids with gas and withdrawal of said solids from the outlet chamber.

3. The apparatus of claim 2 wherein the bottom wall is of conic shape, the apex thereof is projected outwardly and the vertical baffle is joined to the bottom wall substantially at the apex.

4. The apparatus of claim 2 wherein both inlet and outlet chambers contain separate gas inlet and gas outlet means.

5. An apparatus for conducting a gas-fluidized solids reaction comprising a vertically disposed, elongated vessel with enclosing top, bottom, and outer walls, a perforated plate mounted substantially across the width of the outer walls, above and substantially parallel to the bottom wall of the vessel to form a plenum chamber, a transverse baffle mounted atop the perforated plate and extending vertically upwardly to the top wall to divide the vessel into the two chambers, a solids inlet chamber and a solids outlet chamber which function simultaneously as separate gas-fluidized solids treating chambers, solids inlet and solids outlet means for introduction and removal of solids from the treating chambers, respectively, an opening through the transverse baffle intermediate and plenum chamber and the top wall, and in combination therewith an overflow member within the outlet chamber affixed to the vertical baffle below the opening and extending upwardly around and to a location above the opening forming a pocket partially enclosing same to form, with the opening, an aerated weir seal whereby, in operation, gas can be passed into the two solids treating chambers via bottom gas inlet means through the plenum chamber and out of said chamber via top outlet means located in each of the chambers, said chambers being capable of solids flow communication one with the other via one-way passage of fluidized solids from the solids inlet chamber through the opening of the aerated weir seal into the pocket formed by the overflow member, and thence via overflow across the overflow member to the solids outlet chamber so that backmixing of the fluidized solids between the chambers is virtually eliminated.

6. The apparatus of claim 5 wherein is included a bottom wall of conic shape, the apex of which is projected outwardly.

7. An apparatus for conducting a gas-fluidized solids reaction comprising a vertically disposed, elongated vessel with enclosing top, bottom and outer walls, and within which vessel is contained an inner enclosing side wall of sufficiently lesser diameter than that of said outer wall to form a solids inlet chamber between the walls and a solids outlet chamber within the enclosure of the inner side wall, inlet and outlet means for introduction and removal of solids and gases to the chambers, and an aerated weir seal solids flow communication means from the inlet chamber to the outlet chamber, this including the combination of an opening through the inner side wall connecting together the inlet and outlet chambers, and an overflow member within the outlet chamber affixed to the inner side wall below the opening, and extending upwardly around and to a location above the opening forming a pocket partially enclosing same to provide one-way flow of fluidized solids from the inlet chamber through the opening into the pocket and thence overflow across the overflow member to the outlet chamber whereby backmixing of the fluidized solids is substantially eliminated.

8. The apparatus of claim 7 wherein a plurality of aerated weir seals are provided within the inner side wall.

9. An apparatus for conducting a fluidized solids reaction comprising a vertically disposed, elongated vessel with enclosing top, bottom and outer walls, and within which vessel is contained a plate mounted substantially across the width of the outer walls, and also above and substantially parallel to the bottom of the vessel to form a primary plenum chamber, an inner enclosing side wall of less diameter than said outer wall, forming a solids inlet chamber between the outer and inner side walls and a solids outlet chamber within the enclosing inner side wall, said portion of the plate lying outside the inner wall and within the outer wall being perforated to provide gas inlet means to the solids inlet chamber, a second perforated plate mounted across the width of the inner wall forming the outlet chamber, said second perforated plate being above and parallel to the perforated plate across the outer walls to form a secondary plenum chamber, said primary and second plenum chambers being individually open to gas flow means for introduction of gas into the inlet and outlet chambers, respectively, gas outlet means for removal of gas from the chambers, and an aerated weir seal providing solids flow communication means from the inlet chamber to the outlet chamber, said aerated weir seal including the combination of an opening through the inner enclosing side wall and an overflow member within the outlet chamber affixed to the inner side wall below the opening, and extending upwardly around and to a location above the opening forming a pocket partially enclosing same to provide for the one-way flow of fluidized solids from the inlet chamber through the opening into the pocket and thence via overflow across the overflow member to the outlet chamber whereby backmixing of the fluidized solids is substantially eliminated.

10. The apparatus of claim 9 wherein a plurality of aerated weir seals is provided within the inner side wall.

11. The apparatus of claim 9 wherein the inner enclosing wall forming the outlet chamber is provided with an enclosing top wall and provided with gas outlet means separate from the gas outlet means from the inlet chamber.

12. The apparatus of claim 9 wherein the outer enclosing side wall of the vessel is of cylindrical shape and the inner enclosing side wall is substantially concentric thereto.

13. In combination, a series of reaction vessels for conducting fluidized solids reactions, each of which series includes a vessel having enclosing side, top and bottom walls, and within the confines of which is contained a vertical baffle dividing the interior of the vessel into separate chambers, including inlet and outlet chambers, and through which baffle is contained an aerated weir seal including an opening connecting together inlet and outlet chambers, and in combination with the opening an overflow member within an outlet chamber affixed to the vertical baffle below the opening, and extending upwardly around and to a location above the opening partially enclosing same to provide for the one-way flow of fluidized solids from the inlet chamber through the opening and into the pocket and thence overflowed across the overflow member to the outlet chamber to substantially eliminate backmixing of the fluidized solids of the chambers, and solids withdrawal means within the outer chamber for introduction of solids into the inlet chamber of a succeeding vessel.

14. An apparatus for conducting a gas-fluidized solids reaction comprising a vertically disposed, elongated vessel with enclosing top, outer and bottom wall of conic shape, the apex thereof being projected outwardly, a transverse baffle joined to the bottom wall substantially at the apex and extending vertically upwardly to the top wall to divide the vessel into two chambers, a solids inlet chamber and a solids outlet chamber which function simultaneously as separate gas-solids treating chambers, solids inlet and outlet means located within said solids inlet and solids outlet chambers, respectively, bottom inlet and top outlet means for introduction and removal of gases from each of said chambers, an opening through the transverse baffle and in combination therewith and overflow member within the outlet chamber affixed to the vertical baffle below the opening, extending upwardly around to the location above the opening forming a pocket partially enclosing same to form, with the opening, an aerated weir seal whereby, in operation, solids within the two chambers can be separately treated with gas, and solids can flow from the inlet chamber to the outlet chamber via one-way passage of fluidized solids through the opening of the aerated weir seal into the pocket and across the overflow member, so that backmixing of fluidized solids between the chambers is virtually eliminated.

References Cited by the Examiner

UNITED STATES PATENTS

| | | |
|---|---|---|
| 2,358,497 | 9/1944 | Egloff. |
| 2,401,739 | 6/1946 | Johnson. |
| 2,445,328 | 7/1948 | Keith. |
| 2,586,818 | 2/1952 | Harms. |
| 2,650,155 | 8/1953 | Medlin. |
| 2,752,407 | 6/1956 | Cahn. |
| 2,890,106 | 6/1959 | Heath _____ 23—284 |
| 2,906,609 | 9/1959 | Harper. |

FOREIGN PATENTS 586,790   11/1959   Canada.

MORRIS O. WOLK, *Primary Examiner.*